(12) United States Patent
Hanes

(10) Patent No.: US 11,441,040 B2
(45) Date of Patent: Sep. 13, 2022

(54) ELECTRONIC DEVICE HOUSINGS

(71) Applicant: HEWLETT-PACKARD DEVELOPMENT COMPANY, L.P., Spring, TX (US)

(72) Inventor: David H Hanes, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 164 days.

(21) Appl. No.: 16/605,761

(22) PCT Filed: Apr. 21, 2017

(86) PCT No.: PCT/US2017/028759
§ 371 (c)(1),
(2) Date: Oct. 16, 2019

(87) PCT Pub. No.: WO2018/194639
PCT Pub. Date: Oct. 25, 2018

(65) Prior Publication Data
US 2021/0122929 A1    Apr. 29, 2021

(51) Int. Cl.
| | | |
|---|---|---|
| *G01K 11/14* | (2006.01) | |
| *C09D 5/29* | (2006.01) | |
| *C09B 9/00* | (2006.01) | |
| *C09D 5/26* | (2006.01) | |
| *G01K 11/12* | (2021.01) | |
| *G08B 5/00* | (2006.01) | |

(Continued)

(52) U.S. Cl.
CPC .................. *C09D 5/29* (2013.01); *C09B 9/00* (2013.01); *C09D 5/26* (2013.01); *G01K 11/12* (2013.01); *G08B 5/00* (2013.01); *G08B 21/182* (2013.01); *H05K 5/02* (2013.01)

(58) Field of Classification Search
CPC ... C09D 5/29; C09D 5/26; C09B 9/00; G01K 11/12; G08B 5/00; G08B 21/182; H05K 5/02
See application file for complete search history.

(56) References Cited

U.S. PATENT DOCUMENTS

| | | |
|---|---|---|
| 5,805,245 A | 9/1998 | Davis |
| 6,466,299 B1 | 10/2002 | Lehtiniemi et al. |

(Continued)

FOREIGN PATENT DOCUMENTS

| | | | |
|---|---|---|---|
| WO | WO-2008148964 | | 12/2008 |
| WO | WO 2011117470 | * | 9/2011 |
| WO | WO-20111172170 A1 | | 9/2011 |

*Primary Examiner* — Hongmin Fan
(74) *Attorney, Agent, or Firm* — Thorpe North & Western LLP

(57) ABSTRACT

The present disclosure is drawn to an electronic device housing that can include a heat sensitive coating and a second heat sensitive coating applied to an electronic device housing. The heat sensitive coating or portion thereof can include a thermochromatic colorant having a color-changing activation temperature, and the second heat sensitive coating or portion thereof can include a second thermochromatic colorant having a second color-changing activation temperature. The color-changing activation temperature can be a temperature from 30° C. to about 100° C., and the second color-changing activation temperature can be at least 5° C. greater than the color-changing activation temperature.

8 Claims, 2 Drawing Sheets

(51) Int. Cl.
*G08B 21/18* (2006.01)
*H05K 5/02* (2006.01)

(56) References Cited

U.S. PATENT DOCUMENTS

| | | |
|---|---|---|
| 6,816,149 B1 | 11/2004 | Alsleben |
| 7,513,682 B2 | 4/2009 | McClure et al. |
| 8,231,926 B2 * | 7/2012 | Nesbitt .................. A61L 31/10 |
| | | 427/2.1 |
| 2006/0081639 A1 * | 4/2006 | Lazaroff ............... A47J 27/212 |
| | | 220/573.1 |
| 2006/0287215 A1 | 12/2006 | McDonald et al. |
| 2012/0120167 A1 | 5/2012 | Poxon |
| 2015/0173178 A1 | 6/2015 | Morzos |
| 2016/0200930 A1 | 7/2016 | Ribi |
| 2016/0244250 A1 | 8/2016 | Dolan |
| 2016/0311249 A1 | 10/2016 | Futaihong |

\* cited by examiner

ELECTRONIC DEVICE HOUSINGS

BACKGROUND

Electronic devices are utilized everyday by the general public. Increased utilization and dependence on these electronic devices creates additional consumer demands. These demands can be aesthetic and/or can be functional. Aesthetically, the appearance of an electronic device can be customized to meet the personal interests of the consumer. Functionally, performance indicators may permit users, manufacturers, and/or service technicians to evaluate problems associated with electronic device.

DETAILED DESCRIPTION

Figure 1:
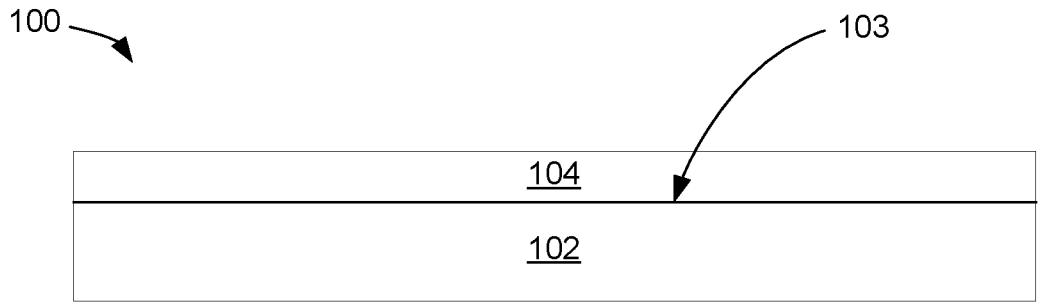
FIG. 1 graphically depicts an example electronic device housing in accordance with the present disclosure.

Increased utilization and dependence on electronic devices increases consumers demands for aesthetic design choices and higher performance standards. In accordance with examples of the present disclosure, specialized coatings as described herein can be used to improve the interaction between the consumer and the electronic device, and/or the manufacturer/servicer and the electronic device. For example, a specialized coating or coatings can serve to provide an indicator of a potential or past problem with an electronic device or a component of the electronic device, e.g., to a user, manufacturer, or service technician.

In accordance with this, in one example, an electronic device housing can include a heat sensitive coating and a second heat sensitive coating applied to an electronic device housing surface. The heat sensitive coating or portion thereof can include a thermochromatic colorant having a color-changing activation temperature. The second heat sensitive coating or portion thereof can include a second thermochromatic colorant having a second color-changing activation temperature. In this example, the color-changing activation temperature can be at a temperature from 30° C. to about 100° C., and the second color-changing activation temperature can be at least 5° C. greater than the color-changing activation temperature.

The term "activation temperature" can be a specific temperature, or it can reflect a narrow temperature range where thermochromatic colorants undergo a color change or change in visual appearance. When referring to "color change" or a change in "visual appearance," this can reflect changes across the color spectrum and further includes the absence of color, e.g., black or clear or white. For example, a color change or change in visual appearance can include from white to clear, white to color, white to black, clear to white, clear to color, clear to black, black to white, black to clear, black to color, color to white, color to clear, color to black, and from one color to another color, from one shade to a different shade of the same color, etc. Thus, the term "color" can include both traditional colors, as well as black and white and clear.

In some examples, the thermochromatic colorant can be a reversible thermochromatic colorant, and the second thermochromatic colorant can be an irreversible thermochromatic colorant. Thus, a first color change may act as a warning to a user of increased temperatures, and a second color change may permanently mark a housing indicating that the device has been overheated, for example. In another example, the thermochromatic colorant can be a reversible thermochromatic colorant, and the second thermochromatic colorant can also a reversible thermochromatic colorant. These color changes may be merely aesthetic, or can provide reversible warnings to a user, for example.

The heat sensitive coating and the second heat sensitive coating can be applied to the electronic device housing surface as a multi-layered color-changing composite, or alternatively, they can be applied to the electronic device housing surface laterally adjacent to one another. In some examples, they may be applied laterally adjacent to one another with some overlap. In either example, the heat sensitive coating, the second heat sensitive coating, or both, can be coated with a clear protective overcoat.

In another example, an electronic device housing can include an exterior surface and a heat sensitive coating applied to the exterior surface. The heat sensitive coating or a portion thereof can include a leuco dye and a polymeric binder. At room temperature, the heat sensitive coating or portion thereof can have a first visual appearance, and at a color-changing activation temperature from 30° C. to 100° C., the heat sensitive coating or portion thereof can have a second visual appearance. "Room temperature" is defined herein to be 23° C. In one specific example, the second visual appearance can indicate that electronics supported by the electronic device housing are near an overheated operating temperature. The overheated operating temperature can be determined by the manufacturer, for example, and the term "near" can be defined as a predetermined temperature within 10° C. (e.g., 10° C. or less) of the overheated operating temperature (but no equal to the overheated operating temperature). Within 10° C. can also encompass 5° C. or less, 3° C. or less, 1° C. or less, etc.

In one specific example, the leuco dye can be thermochromatic at the activation temperature. In another example, the leuco dye can be reactive with an activator at the activation temperature. To illustrate, the heat sensitive coating can further include an activator that is reactive with the leuco dye at the activation temperature, but not before. In a more detailed and specific example, the leuco dye or the activator can be within a continuous phase (e.g., dissolved) of the heat sensitive coating at room temperature, and the other (of the leuco dye or activator) can be in a discontinuous phase (e.g., dispersed) in the heat sensitive coating at room temperature. In either example, the leuco dye can react with the activator upon exposure to the color-changing activation temperature.

In another example, a method of determining if an electronic device has overheated can include inspecting a surface of the electronic device, wherein the surface includes a heat sensitive coating applied thereto. The heat sensitive coating or a portion thereof can include an irreversible thermochromatic colorant having a color-changing activation temperature corresponding to a maximum operating temperature of the electronic device, and wherein a color change indicates that the electronic device has operated at or above an overheated operating temperature. The term "maximum operating temperature" can be defined to be the highest temperature that the electronic device can safely operate without risk of damage, e.g., the temperature above which damage may begin to occur to the electronic device. The temperature may be within the range of 30° C. to 100° C., for example. In one example, the surface can be on an individual component of the electronic device and can be hidden from view beneath a housing of the electronic device. For example, a circuit board can include the heat sensitive coating, and this coating can be intended to be viewed by the manufacturer or service technician to determine if the maximum operating temperature has been exceeded. In another example, the surface can be visible to the user. In either example, generally, this color change can indicate whether or not the electronic device has operated at an overheated operating temperature.

In each of these examples, including the electronic device housings and the methods, the coating can be applied to a surface of the housing, such as, for example, a housing for a laptop, a desktop console, a video game console, a computer mouse, keyboard, keycaps, a printer, a monitor, a speaker, a head set, head phones, a television, a camera, a flash drive, a hard drive, a smart watch, a smart phone, watch band, fitness tracker, others, or a combination thereof.

Further, in each of these examples, including the electronic device housings and the methods, the coatings can be prepared to have a color changing activation temperature from 30° C. to 100° C., 40° C. to 100° C., 50° C. to 100° C., 30° C. to 60° C., from 30° C. to about 50° C., or from 50° C. to about 80° C., and other suitable temperature ranges.

It is noted that when discussing the various electronic device housing and methods described herein, each of these discussions can be considered applicable to the other examples, whether or not they are explicitly discussed in the context of that example. Thus, for example, in discussing a colorant related to the method, such disclosure is also relevant to and directly supported in the context of the electronic device housings described herein, and vice versa.

With specific reference to the colorants that can be used, in certain examples, the colorants can be thermochromatic, e.g., thermochromatic pigments, thermochromatic liquid crystals, and/or thermochromatic leuco dyes, for example. However, in some examples, heat sensitive coatings can be formulated to cause color change based on temperature change, regardless of the specific mechanism. For example, a thermochromatic colorant (pigment or dye) can be thermochromatic per se, in that it is sensitive to temperature change in and of itself, either reversibly or irreversibly. On the other hand, the coating composition as a whole may be heat sensitive, and various components interact together upon application of heat to cause the color change. To illustrate, a heat sensitive coating composition can include a color-changing colorant and activator, one of which can be in a continuous phase (dissolved) and the other can be in a discontinuous phase (encapsulated, nano- or micro-droplets, etc.). In this example, when heated, the activator and the colorant are brought together to effectuate the color change. In other examples, the heat sensitive coating can include a suppression agent and/or an initiator precursor. Thus, when heated, the suppression agent can become less effective and color change can initiate. In yet another example, the colorant can include a latent developer that can be sensitive to heat. These and other arrangements can be used to develop the heat sensitive coatings.

With specific reference to thermochromatic pigments, these pigments exhibit a change in their color that can be reversible or irreversible. The color change can be from visible to invisible, from one color to another color, or from invisible to visible. In one example, the thermochromatic pigment can be a heat sensitive pigment that changes color upon reaching a color changing activation temperature. Reversible thermochromatic pigments can then return to their original color, visible, or invisible form upon cooling to a temperature below the color changing activation temperature. In another example, the thermochromatic pigment can exhibit a color change upon reacting with an activator. The activator can include, for example, an electron donating chromic organic compound, an electron accepting compound, a color changing controlling agent, a color former, a reaction medium, or combinations thereof.

In some examples, a thermochromatic pigment can be encapsulated. The capsules can include a shell and a core. In some examples, the core can include a solvent and a pigment. The capsule can rupture allowing the pigment to be exposed. In another example, the thermochromatic pigment can be dissolved or dispersed in a solvent. In a further example, thermochromatic pigment can be blended with a resin.

Exemplary commercially available thermochromatic pigments can include but are not limited to, Thermochromatic BT-31, Thermochromatic VT-31, PhotoChromic BL-60S, and PhotoChromic VL-70S (KELLY CHEMICAL CORP.); Covapearl Sparkling Silver 937 AS, Covapearl Silver 939 AS, Covapearl Sparkling Gold 238 AS, Covapearl Fire Red 333 AS, Covapearl Antique Silver 239 AS, Covapearl Bright 933 AS, Covapearl Satin 931 AS, Covapearl Antique 236 AS, Covapearl Pink 433 AS, Covapearl Red 339 AS, and Covapearl Blue 635 AS (Adina Cosmetics); Aztec Gold 305, Rutile sterling 103 and 108, Silk Pearl 173, Bronze Satin 310, Rutile Luster satin 121 and 130, Fine Gold Satin 201, Wine Red Satin 524, Wine Red Satin 224, Bronze Satin 530, Fine Gold Satin 201, Platinum Pearl 205, and Special Flash Pearl 183 (Zhejiang Aoke pearlescent Pigment Co., Ltd); KTZ Roussillon-TTB2, KTZ Aruban Coral-12, KTZ Aruban Cora, KTZ Shimmer White, KTZ Stellar White 11S2, and KTZ Jaipur Sunset (Kobo Products Inc.); XYMARA PEARL 103 XYMARA™ Marker Green SF1A, XYMARA™ Marker Ice Blue SF2A, XYMARA™ Marker Turquoise LF1A (sold by CIBA); DECO IRIS-GLITTER 2701-322-11 hex RAINBOW (SiLi—SIGMUND LINDER GmbH); VA-516 Yellow and VA-515 Yellow Orange (Vicome Corp.); KW 421 Magic yellow, KW 163 Shimmer Pearl, KW 289 Glitter Blue, KW 534 Shimmer Wine Red, KW 400B Luster Pure Blue, and KW 483 Silky Purple; (WENZHOU KUNWEI PEARL PIGMENTS CO.); StarLight HM72, StarLight SM26, and StarLight FL500 (SHEPHERD); 933 AS, 339AS, 238AS, 939AS, 635AS, 931AS, 239AS, 333AS, 937AS, 433AS, and 236AS (SENSIENT COSMETIC TECHNOLOGIES); Mearlin Hi-Lite Sparkle Gold, Mearlin Hi-Lite Sparkle Violet, Mearlin Hi-Lite Sparkle Green, Mearin Firemist Pearl, Mearin Firemist Violet, and Meariin Firemist Green (ENGELHARD); Deco Iris-Glitter 2701-322-11 hex, Rainbow Polyester-Glitter 2501-81 E-1 hex, Yellow Deco-Polyester Glitter 2701-67-11 hex, Multi Deco Hologramm 2701-59A-11 hex, Copper Deco-Iris Glitter 2701-300FM-11 hex, Way Too Pink Alu-Glitter 2101-54-1sq, Royal Blue Alu-Glitter 2110-50-1 sq, Bright Silver Alu-Glitter 2101-43-1 sq, and Rich Red Gold (SIGMUND LINDER GmbH), or combinations thereof.

Other thermochromatic colorants that can be used include thermochromatic liquid crystals. These colorants can exhibit a change in their structural arrangement upon exposure to heat. The change in the structural arrangement can affect the way the crystal reflects light and the color that an individual views. In one example, thermochromatic liquid crystals can be microencapsulated in the heat sensitive coating. In some examples, the heat sensitive coatings can include a liquid carrier. Some exemplary components of liquid carriers can include but are not limited to include, ethyl-3-ethoxy propionate, methyl ethyl ketone, n-butyl acetate, propylene glycol monomethyl ether acetate, toulene, xylene, VM & P naptha, urethane, polyurethane, or combinations thereof.

In a further example, the thermochromatic colorant can be a leuco dye. Leuco dyes can be capable of changing from visible to invisible, from one color to another color, or from invisible to visible. Many commercially available leuco dyes are suitable for use in the heat sensitive coating described herein. Exemplary leuco dyes can include but are not limited to, 2(p-hydroxyphenyl)4, 5-diphenylimidazoles; amino-2,3-dihydroanthraquinones; amino-9,10-dihydroacridines; aminodihydrophenazines; aminodiphenyl methanes; aminohydrocinnamic acids; aminophenohiazines; aminophenoxazines; aminothioxanthenes; amino-triarylmethanes; aminoxanthenes; cyanoethanes; fulgides; fluorans; hydrozines; indanones; leuco indamines; leuco indigoid dyes; leuco methines; phenethylanilines; phthalides; spiro compounds; spirolactones; spiropyrans; sulfur dyes; tetrahalo-p,p'-biphenols; triphenyle methanes; corresponding esters; or combinations thereof.

Thermochromatic colorants, such as leuco dyes and thermochromatic pigments, can be sensitive to temperature changes per se, or they can be sensitive to temperature due to their interaction with an activator under temperature. Activators, for example, can work by oxidation, reduction, protonation, or ring opening of the colorant. Activators can be selected to correspond to the specific colorants selected for use. In one example, the activator can include a phenol, carboxylic acid, cyclic sulfonamide, protonic acid, or compound having a pKa of less than about 7.0. Specific phenolic and carboxylic activators can include, without limitation, boric acid, oxalic acid, maleic acid, tartaric acid, citric acid, succinic acid, benzoic acid, stearic acid, gallic acid, salicylic acid, 1-hydroxy-2-naphthoic acid, o-hydroxybenzoic acid, m-hydroxybenzoic acid, 2-hydroxy-p-toluic acid, 3,5-xylenol, thymol, p-t-butylphenyl, 4-hydroxyphenoxide, methyl-4-hydroxybenzoate, 4-hydroxyacetophenone, a-naphthol, naphthols, catechol, resorcin, hydroquinone, 4-t-octylcatechol, 4,4'-butylidenephenol, 2,2'-dihydroxydiphenyl, 2,2'-methylenebis(4-methyl-6-t-butyl-phenol), 2,2'-bis(4'-hydroxyphenyl) propane, 4,4'-isopropylidenebis(2-t-butylphenol), 4,4'-secbutylidenediphenol, pyrogallol, phloroglucine, phlorogluocinocarboxylic acid, 4-phenylphenol, 2,2'-methylenebis(4-chlorophenyl), 4,4'-isopropylidenediphenol, 4,4'-isopropylidenebis(2-chlorophenol), 4,4'-isopropylidenebis(2-methylphenol), 4,4'-ethylenebis(2-methylphenol), 4,4'-thiobis(6-t-butyl-3-methylphenol), bisphenol A and its derivatives (such as 4,4'-isopropylidenediphenol (bisphenol A), 4-4'-cyclohexylidenediphenol, p,p'-(1-methyl-n-hexylidene) diphenol, 1,7-di(4-hydroxyphenylthio)-3,5-dioxaheptane), 4-hydroxybenzoic esters, 4-hydroxyphthalic diesters, phthalic monoesters, bis(hydroxyphenyl)sulfides, 4-hydroxyarylsulfones, 4-hydroxyphenylarylsulfonates, 1,3-di[2-(hydroxyphenyl)-2-propyl]benzenes, 1,3-dihydroxy-6(.alpha.,.alpha.-dimethylbenzyl)benzene, resorcinols, hydroxybenzoyloxybenzoic esters, bisphenolsulfones, bis-(3-allyl-4-hydroxyphenyl) sulfone (TG-SA), bisphenolsulfonic acids, 2,4-dihydroxybenzophenones, novolac type phenolic resins, polyphenols, saccharin, 4-hydroxy-acetophenone, p-phenylphenol, benzyl-p-hydroxybenzoate (benzalparaben), 2,2-bis(p-hydroxyphenyl) propane, p-tert-butylphenol, 2,4-dihydroxy-benzophenone, and p-benzylphenol.

In one example, the activator can be a protected activator. Protected activators can include at least one acid group and a protection leaving group chemically attached to the at least one acid group. Upon heating, the protection leaving group can react with a de-protecting agent, exposing the acid group on the activator, and allowing for a reaction to occur between the acid group on the activator and the leuco dye. Exemplary protected activators can include but are not limited to, trifluoroacetate, 2-trimethylsilyl ethyl ester, t-butyl ester, p-nitrobenzyl ester, nitrobutyl ester, trichloroethyl ester, or combinations thereof. In one aspect, the protection leaving group provides a mechanism for protecting the acid functional group of the activator. When the functional group of the activator is a hydroxy group, suitable protecting groups can include esters, sulfonates, ethers, phosphinates, carbonates, carbamates (e.g., esters of carbamic acid), or mixtures thereof.

The various thermochromatic coating compositions can also include a polymeric binder to support the colorant on the surface of the electronic device or electronic device housing. Suitable polymeric binders can include various polymers and copolymers, e.g., polyurethanes, polyureas, copolymers of methacrylic acid and/or acrylic acid, copolymers of styrene, or the like. UV curable lacquers can also be used to form the thermochromatic coatings described herein. In some examples, electronic device can include an additional coating, such as a protective clear overcoat and/or additional heat sensitive coatings.

Turning now to specific applications of the heat sensitive coatings described, such coatings can be used to inform an individual about a temperature problem with an electronic device. For example, the coating can inform a user of an issue with the cooling system in the electronic device, such as a fan failure in a laptop, desktop console, or video game console. In another example, the coating can inform a user that an electronic device is too hot to touch and/or too hot to start use or continue using. This can serve as an indicator to the user that the electronic device needs to cool down before use in order to avoid damage. In another example, an irreversible coating can inform a manufacturer or a service technician that a user has allowed the electronic device or a component of the electronic device to overheat beyond a maximum operating temperature. This can be useful in voiding a manufacturers warranty and/or pointing a manufacturer or service technician to the malfunctioning component in the electronic device. In some instances, the coating can allow users to see that an issue is occurring before the electronic device is damaged and/or the user is injured, thus serving as a warning to a user to stop use prior to damage or injury. In one example, the coating can serve as a warning to prevent burns. In yet another example, the coating can deliver a message or a hidden image to a user. This can be useful in promotional marketing and/or to remind a user to take a break. In a further example, the coating can be used for novelty or aesthetic purposes, or simply to appeal to the interests of the user.

The intended purpose of the coating along with the electronic device can also assist in determining a desired color changing activation temperature. In one example, the color-changing activation temperature can range from 30° C. to 100° C. This range can include normal operating temperatures for a wide variety of electronic devices and maximum operating temperatures for those electronic devices. In another example, the color-changing activation temperature can range from 30° C. to 80° C. This range can generally include maximum operating temperatures for a variety of electronic devices. For example, a smart phone generally can have a maximum operating temperature of about 35° C.; a smart watch generally can have a maximum operating temperature of about 45° C.; and a desktop computer or laptop can generally have a maximum operating temperature ranging from about 50° C. to about 75° C. depending on the electrical components contained therein.

In yet another example, the color-changing activation temperature can range from about 30° C. to 40° C. This range can encompass normal operating temperatures for desktop computers and laptops. In a further example, the color-changing activation temperature can range from about 45° C. to 80° C. This range can encompass maximum operating temperatures for desktop computers and laptops. In one example, a color change can indicate that electronics supported by the electronic device housing are at or near an overheated operating temperature. In some examples, the color changing activation temperature can range from about 35° C. to about 50° C. This temperature range encompasses average human body temperatures, e.g. about 37° C. Other temperature ranges are provided elsewhere herein.

In further detail, the change in color can vary depending on the color-changing colorant and the intended use. In one example, the change in color can be from invisible to visible, e.g., from clear to a color, white, black, or a combination thereof. In another example, the change in color can be from visible to invisible, i.e. from a color, white, black, or a combination thereof to clear. The change in color can likewise be from a color to another color (including black or white). The location of the color-changing colorant in the coating can also play a factor. For example, the coating can cover only a portion of the exterior surface and can be used to display an image or text. Alternatively, the colorant can simply conceal an image or text that exists on the exterior surface of the electronic device.

Turning now to the FIGS., an exemplary electronic device housing 100 is shown in FIG. 1. The electronic device housing includes a housing body 102 with an exterior surface 103. A heat sensitive coating 104 can be applied to the exterior surface. For example, the heat sensitive coating or portion thereof can include a leuco dye and a polymeric binder.

Figure 2:
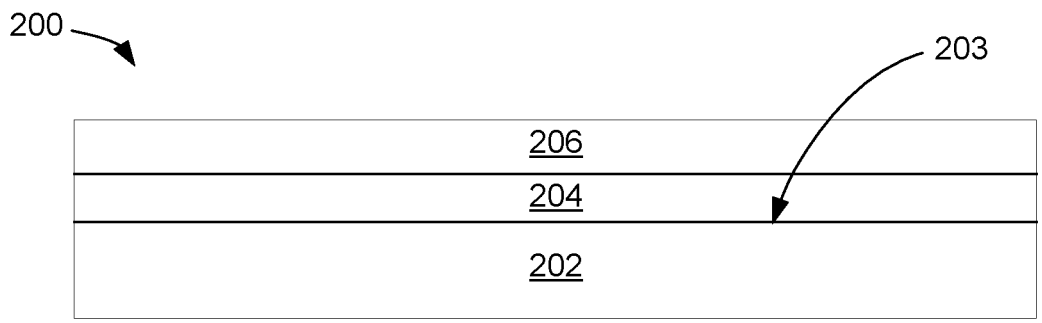
FIG. 2 graphically depicts an example electronic device housing in accordance with the present disclosure.

In another example, as shown in FIG. 2, an electronic device housing 200 can further include a protective clear coat 206 applied over the heat sensitive coating 204. In this example, again, the electronic device housing includes a housing body 202 with an exterior surface 203 to which the heat sensitive coating is applied. The heat sensitive coating or portion thereof, for example, can include a leuco dye and polymeric binder.

Figure 3:
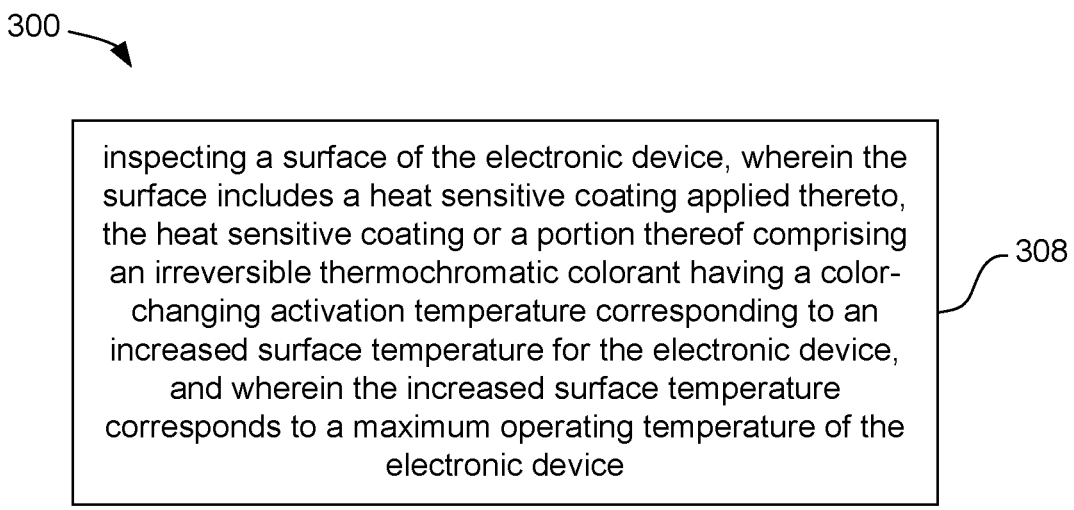
FIG. 3 graphically depicts an example method of determining if an electronic device has overheated in accordance with the present disclosure.

In another example, as mentioned previously, a method of determining if an electronic device has overheated is disclosed. In one example, as illustrated in FIG. 3, the method 300 can include inspecting 308 a surface of the electronic device, wherein the surface includes a heat sensitive coating applied thereto. The heat sensitive coating or a portion thereof can include an irreversible thermochromatic colorant having a color-changing activation temperature corresponding to a maximum operating temperature of the electronic device. A color change can thus indicate that the electronic device has operated at or above an overheated operating temperature.

In one example, the surface can be a housing of the electronic device, or an individual interior component thereof. Thus, the surface can be an internal component that can be hidden from view beneath a housing of the electronic device. Exemplary internal components can include, but are not limited to include, integrated circuit board, chipset, graphic card, motherboard, hard drive, random access memory (RAM), processor, CPU, GPU, microcontroller, battery, power supply unit, optical drive, network technology, Wi-Fi, Ethernet, USB, inputs, outputs, or a combination thereof. In one example, the surface can be a circuit board. In another example, the surface can be a motherboard. Coating an interior surface with an irreversible thermochromatic colorant can help a manufacturer or service technician easily identify an overheated/damaged component in an electronic device. In another example, the surface can be on a surface that is visible to the user, such as on a housing of the electronic device. In either example, the irreversible color change can occur at a temperature ranging from 30° C. to 100° C. In another example, the irreversible color change can occur at a temperature ranging from 40° C. to 80° C. In a further example, the irreversible color change can occur at a temperature ranging from 50° C. to 60° C. In yet another example, the irreversible color change can occur at a temperature ranging from 50° C. to 80° C.

As mentioned, the thermochromatic colorant used in the heat sensitive coating can include a thermochromatic pigment, a leuco dye, or a thermochromatic liquid crystal, for example. In one example, the thermochromatic colorant can be a leuco dye which is present in the coating with an activator, or a leuco dye and some secondary chemical component that interacts with the leuco dye when exposed to heat at the activation temperature, as previously described.

In another example, an electronic device housing can include multiple color-changing coatings. These arrangements are shown generally at FIGS. 4 and 5. In one example, shown in FIG. 4, the coatings can appear adjacent to one another and in the same plane. There, the electronic device housing 400 can include a housing body 402 with an electronic device housing surface 403 having a heat sensitive coating 412 and a second heat sensitive coating 414 applied thereto. The heat sensitive coating and the second heat sensitive coating in this example are applied adjacent to one another (in contact with one another in this specific example).

Figure 5:
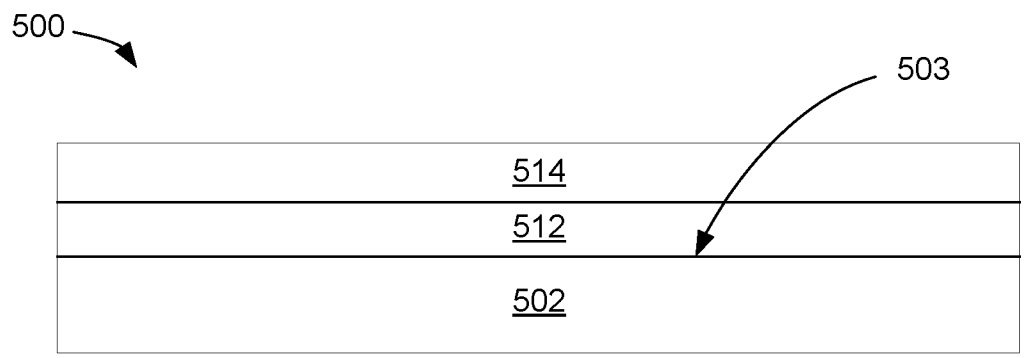
FIG. 5 graphically depicts an example electronic device housing with multiple color-changing coatings in accordance with the present disclosure.

In another example, the multiple color-changing coatings can be layered one over top of the other to form a multi-layered color-changing composite. This arrangement is illustrated in FIG. 5. There, the electronic device housing 500 includes an electronic device housing surface 503 of a housing body 502. A heat sensitive coating 512 and a second heat sensitive coating 514 are applied in layers on the surface.

Figure 4:
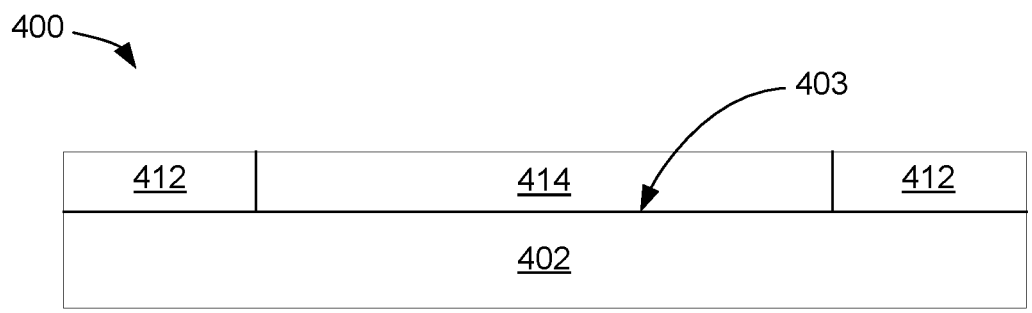
FIG. 4 graphically depicts an example electronic device housing with multiple color-changing coatings in accordance with the present disclosure.

In either example shown in FIGS. 4 and 5, the color-changing activation temperatures of the two coatings or layers can be set at a 5° C. differential or more. Furthermore, in one example, the lower activation temperature can activate a reversible color change, and the higher activation temperature can activate an irreversible color change. In still another example, both color changes can be reversible, or both can be irreversible. Not shown in this example, but shown in FIG. 2, a protective clear coat can be applied to either the heat sensitive coating, the second heat sensitive coating, or both.

It is noted that, as used in this specification and the appended claims, the singular forms "a," "an," and "the" include plural referents unless the content clearly dictates otherwise.

As used herein, the term "thermochromatic colorant" refers to various types of colorants that change in color as a function of exposure to a temperature change. Examples include thermochromatic pigments, leuco dyes, thermochromatic liquid crystals, etc. The color-altering phenomenon is typically due to a chemical change, such as through oxidation, resulting from heat exposure.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight ratio range of about 1 wt % to about 20 wt % should be interpreted to include not only the explicitly recited limits of about 1 wt % and about 20 wt %, but also to include individual weights such as 2 wt %, 11 wt %, 14 wt %, and sub-ranges such as 10 wt % to 20 wt %, 5 wt % to 15 wt %, etc.

EXAMPLES

The following examples illustrate the technology of the present disclosure. However, it is to be understood that the following is only exemplary or illustrative of the application of the principles of the presented electronic device housings and methods. Numerous modifications and alternative methods may be devised by those skilled in the art without departing from the present disclosure. The appended claims are intended to cover such modifications and arrangements. Thus, while the present disclosure has been described above with particularity, the following provides further detail in connection with what are presently deemed to be the acceptable examples.

Example 1—Thermochromatic Leuco Dye Coating

A heat sensitive coating is prepared using about 2 g of dibenzyl oxalate powder heated to about 85° C. to cause melting of the powder. An activator, such as about 20 g of phenol,4,4'-sulfonylbis(2-(2-propenyl), is added to the melted powder. The resulting composition is cooled and ground into a fine powder. Next, about 2 g of the ground fine powder is dissolved in about 15 g of a UV-lacquer along with 2 g of bisphenol-A as a carrier to form a coating solution. About 15 g of black leuco dye is then added to the coating solution to form a heat sensitive coating composition. As a paste, the mixture can be screen-printed (or otherwise coated) onto a surface of a substrate, such as electronic device housing or internal circuitry. Once applied, the coating can be UV cured using ultraviolet radiation from a mercury lamp, for example.

Example 2—Thermochromatic Pigment Coating

A heat sensitive coating is prepared using 25 grams of black thermochromatic pigment powder mixed with 500 mL of a Medium Uni-Reducer, (Autobahn Automotive Finishes, available from CPS Coatings, California), which includes ethyl-3-ethoxy propionate, methyl ethyl ketone, n-butyl acetate, propylene glycol monomethyl ether acetate, toulene, and xylene. The components can be applied by loading into a HVLP spray gun (Central Pneumatic®, available from Harbor Freight Tools®, California). The regulator can be adjusted to a pressure of 10 psi. The coating can be sprayed onto the surface of a substrate, such as electronic device housing or internal circuitry, for example.

Example 3—Clear Protective Overcoat

Once the heat sensitive coatings of Example 1 and/or 2 are applied to a housing surface or internal circuitry, a clear protective overcoat (available from Rust-Oleum® Corp, Illinois) can be applied using the HVLP spray gun at the same pressure regulation over the coating.

Example 4—Application to Electronic Device Housing

A plastic housing for a computer mouse is coated with a first heat sensitive coating (from Example 2) and clear overcoat (from Example 3). Adjacent to, or layered on top of, the first heat sensitive coating, a second heat sensitive coating (from Example 1) and clear overcoat (from Example 3) is applied. In this example, the thermochromatic pigment (from the Example 2 coating) can be a reversible pigment that changes from black to clear upon application of a moderate amount of heat, e.g., a blow dryer set to a high heat temperature and blown on the housing for about 5 seconds causes the thermochromatic pigment to change from black to clear, exposing the underlying housing surface. When the housing cools, the thermochromatic pigment changes back to black in appearance and the housing surface becomes re-concealed. The thermochromatic leuco dye (from the Example 1 coating) can be irreversible when it changes color, and the temperature to cause the color change can be at least 5° C. greater than the color changing temperature of the thermochromatic pigment. Thus, the first heat sensitive coating may provide a warning to a user that a device may be getting warm, and the second heat sensitive coating may provide an irreversible color change indicating that the mouse has operated at or above a maximum safe operating temperature.

Example 5—Application to Internal Circuitry

The thermochromatic leuco dye (from the Example 1 coating) is selected so that it irreversibly changes color at an increased surface temperature corresponding to a maximum operating temperature of the electronic device. Thus, a color change indicates that the electronic device has operated at or above an overheated operating temperature. This irreversible color change provides information to a service technician or manufacturer that the device has operated at or above a maximum safe operating temperature.

While the disclosure has been described with reference to certain examples, various modifications, changes, omissions, and substitutions can be made without departing from the disclosure. It is intended, therefore, that the present disclosure be limited only by the scope of the following claims.

What is claimed is:
1. An electronic device housing, comprising:
a heat sensitive coating applied to an electronic device housing surface, the heat sensitive coating or portion thereof comprising a thermochromatic colorant having a color-changing activation temperature; and a second heat sensitive coating applied to the electronic device housing surface, the second heat sensitive coating or portion thereof comprising a second thermochromatic colorant having a second color-changing activation temperature;

wherein the color-changing activation temperature is at a temperature from 30 to about 100° C., and the second color-changing activation temperature is at least 5 c'e, greater than the color-changing activation temperature; and wherein the second color-changing activation temperature is within 10° C. of an electric device's overheated operating temperature that the housing is sized and shaped to hold therein.

2. The electronic device housing of claim 1, wherein the thermochromatic colorant is a reversible thermochromatic colorant, and the second thermochromatic colorant is an irreversible thermochromatic colorant.

3. The electronic device housing of claim 1, wherein the thermochromatic colorant is a reversible thermochromatic colorant, and the second thermochromatic colorant is also a reversible thermochromatic colorant.

4. The electronic device housing of claim 1, wherein the heat sensitive coating and the second heat sensitive coating are applied to the electronic device housing surface as a multi-layered color-changing composite.

5. The electronic device housing of claim 1, wherein the heat sensitive coating and the second heat sensitive coating are applied to the electronic device housing surface laterally adjacent to one another.

6. The electronic device housing of claim 1, Wherein the heat sensitive coating, the second heat sensitive coating, or both, are coated with a clear protective overcoat.

7. The electronic device housing of claim 1, wherein the electronic device housing is shaped to contain electronic components for a laptop, a desktop console, a video game console, a computer mouse, a keyboard, a keycap, a printer, a monitor, a speaker, a head set, a set of head phones, a television, a camera, a flash drive, a hard drive, a smart watch, a smart phone, a watch band, a fitness tracker, or a combination thereof.

8. The electronic device housing of claim 7, wherein the second thermochromatic colorant is an irreversible thermochromatic colorant and the second color-changing activation temperature corresponds to a maximum operating temperature for the electronic device that the housing is sized and shaped to hold.

* * * * *